US010353407B2

(12) United States Patent
Aughton et al.

(10) Patent No.: US 10,353,407 B2
(45) Date of Patent: *Jul. 16, 2019

(54) DEMAND MANAGEMENT SYSTEM FOR FLUID NETWORKS

(71) Applicant: Rubicon Research Pty Ltd, Hawthorn, Victoria (AU)

(72) Inventors: David John Aughton, Essendon (AU); Sumith Choy, Brunswick East (AU)

(73) Assignee: RUBICON RESEARCH PTY LTD., Hawthorn East, Victoria (AU)

(*) Notice: Subject to any disclaimer, the term of this patent is extended or adjusted under 35 U.S.C. 154(b) by 195 days.

This patent is subject to a terminal disclaimer.

(21) Appl. No.: 15/425,911

(22) Filed: Feb. 6, 2017

(65) Prior Publication Data
US 2017/0147010 A1  May 25, 2017

Related U.S. Application Data

(63) Continuation of application No. 14/236,616, filed as application No. PCT/AU2012/000907 on Aug. 1, 2012, now Pat. No. 9,563,207.

(30) Foreign Application Priority Data

Aug. 2, 2011  (AU) ................ 2011903084

(51) Int. Cl.
G05D 7/06 (2006.01)
G05B 15/02 (2006.01)
(Continued)

(52) U.S. Cl.
CPC ............ G05D 7/0623 (2013.01); E03B 1/02 (2013.01); G05B 13/048 (2013.01); G05B 15/02 (2013.01);
(Continued)

(58) Field of Classification Search
None
See application file for complete search history.

(56) References Cited

U.S. PATENT DOCUMENTS 4,444,625 A * 4/1984 Smith ............... D06F 43/085
134/12
4,730,637 A * 3/1988 White .................. E03B 7/12
137/468

(Continued)

FOREIGN PATENT DOCUMENTS

CN   101641654   2/2010
CN   101858095   10/2010
(Continued)

OTHER PUBLICATIONS

Yao, Xiaoming, "Design and Implementation of Java EE-based Urban Water Supply Management System," Master's Degree Thesis, Information Science and Technology Series, No. 6, Jun. 15, 2010.
(Continued)

Primary Examiner — Ramesh B Patel
(74) Attorney, Agent, or Firm — David D. Brush; Westman Champlin & Koehler, P.A.

(57) ABSTRACT

The invention provides a method of demand management for fluid networks. The method includes the steps of providing a computer controlled fluid network for delivery of fluid to at least one customer (14), maintaining a real time database (16) within the computer controlled fluid network of predetermined parameters, requesting a flow rate and time of delivery of said fluid from the fluid network through a user interface (22) to a customer (20), determining, using predetermined parameters from the real time database (16), the availability (24) of providing delivery of fluid from the fluid network to the customer (14) based on hydraulic capacity of the fluid network, and, if the hydraulic capacity
(Continued)

is available, calculating parameters (38) using the real time database (16) to deliver fluid to the customer (14) through the computer controlled fluid network.

10 Claims, 1 Drawing Sheet

(51) Int. Cl.
    *E03B 1/02* (2006.01)
    *G05B 13/04* (2006.01)
    *E03B 1/00* (2006.01)
(52) U.S. Cl.
    CPC .......... *G05D 7/067* (2013.01); *G05D 7/0635* (2013.01); *E03B 1/00* (2013.01)

(56) References Cited

U.S. PATENT DOCUMENTS

| | | | | |
|---|---|---|---|---|
| 4,925,444 | A * | 5/1990 | Orkin | A61M 5/16827 123/DIG. 13 |
| 5,154,314 | A * | 10/1992 | Van Wormer | G06Q 10/087 141/20 |
| 5,257,982 | A * | 11/1993 | Cohen | A61F 13/5116 604/358 |
| 5,741,980 | A * | 4/1998 | Hill | G01B 5/28 73/861.04 |
| 5,941,305 | A * | 8/1999 | Thrasher | E21B 43/121 166/53 |
| 6,801,135 | B2 * | 10/2004 | Schultz | G01V 11/002 340/853.1 |
| 6,817,419 | B2 * | 11/2004 | Reid | E21B 43/00 166/369 |
| 7,017,116 | B2 * | 3/2006 | Elsbree | G06F 8/38 715/740 |
| 7,152,001 | B2 * | 12/2006 | Aughton | E02B 13/00 702/2 |
| 7,274,996 | B2 * | 9/2007 | Lapinski | G01F 1/666 702/48 |
| 7,673,690 | B2 * | 3/2010 | Somogyi | E21B 33/0355 166/250.15 |
| 7,869,978 | B2 * | 1/2011 | Anderson | E21B 47/042 415/17 |
| 8,886,482 | B2 * | 11/2014 | Higgins | G05B 15/02 340/870.16 |
| 8,892,372 | B2 * | 11/2014 | Peterson | G01F 25/0061 417/36 |
| 9,322,512 | B2 | 4/2016 | Bremer et al. | |
| 2003/0107588 | A1 * | 6/2003 | Elsbree | G06F 8/38 715/700 |
| 2004/0128034 | A1 * | 7/2004 | Lenker | G05D 7/0635 700/282 |
| 2008/0281534 | A1 * | 11/2008 | Hurley | F17D 5/00 702/47 |
| 2009/0099701 | A1 * | 4/2009 | Li | A01G 25/16 700/284 |
| 2010/0168927 | A1 * | 7/2010 | Burrows | E03B 1/00 700/282 |
| 2010/0204924 | A1 * | 8/2010 | Wolfe | C02F 1/008 702/25 |
| 2010/0329903 | A1 * | 12/2010 | Fong | F01K 25/06 417/398 |
| 2011/0093123 | A1 * | 4/2011 | Alexanian | A01G 25/16 700/284 |
| 2011/0115223 | A1 * | 5/2011 | Stahlkopf | F01K 13/02 290/7 |
| 2011/0231320 | A1 * | 9/2011 | Irving | G06Q 30/00 705/80 |
| 2011/0307203 | A1 * | 12/2011 | Higgins | G05B 15/02 702/84 |
| 2012/0192965 | A1 * | 8/2012 | Popper | E03B 7/04 137/357 |
| 2012/0317058 | A1 * | 12/2012 | Abhulimen | G06N 99/005 706/2 |
| 2013/0231787 | A1 * | 9/2013 | Chapman | E21B 44/00 700/282 |
| 2016/0058933 | A1 * | 3/2016 | Ballantyne | A61M 1/1601 210/85 |

FOREIGN PATENT DOCUMENTS

| | | |
|---|---|---|
| JP | H09217900 | 8/1997 |
| KR | 20090002115 | 1/2009 |
| WO | 2012019898 | 2/2012 |

OTHER PUBLICATIONS

Chinese Patent Application No. 201280046810.X, Office Action dated Oct. 8, 2016.
European Patent Application No. 12820610.9, Search Report dated May 13, 2016.
International Application No. PCT/AU2012/000907, International Search Report and Written Opinion dated Sep. 12, 2012 (annotated by Applicant to indicate errors in original document).

* cited by examiner

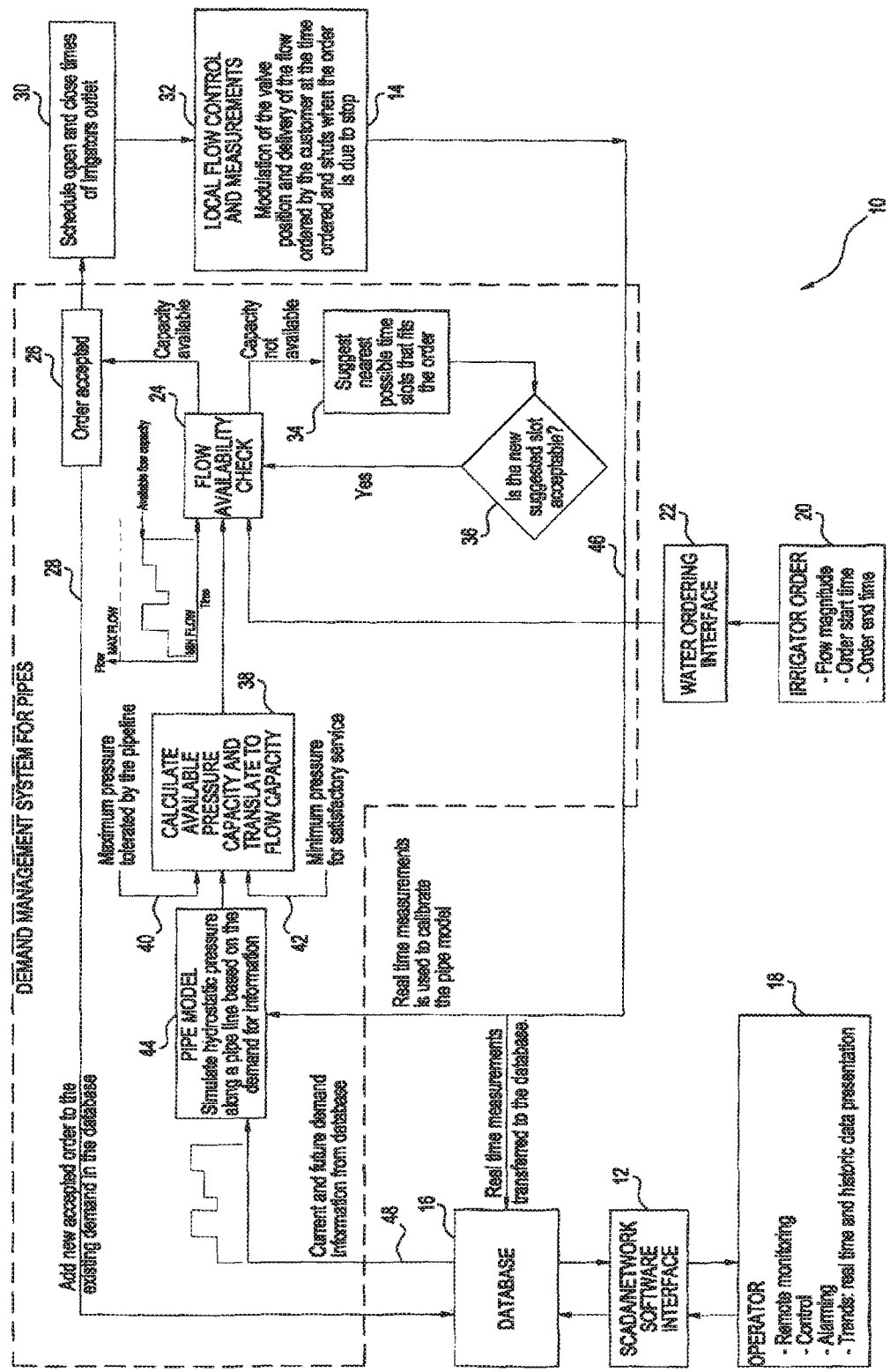

DEMAND MANAGEMENT SYSTEM FOR FLUID NETWORKS

CROSS-REFERENCE TO RELATED APPLICATIONS

This application is a continuation of U.S. patent application Ser. No. 14/236,616, filed Jun. 17, 2014 and entitled "Demand Management System for Fluid Networks," now U.S. Pat. No. 9,563,207, which is a national stage application pursuant to 35 U.S.C. § 371 of International Application No. PCT/AU2012/000907, filed Aug. 1, 2012, which claims priority to AU Patent Application No. 2011903084, filed Aug. 1, 2011, the disclosures of which are hereby incorporated by reference herein.

BACKGROUND OF THE INVENTION

The present invention relates to a demand management system and method of demand management for fluid networks, and relates particularly, though not exclusively, to demand management systems for open conduits (channel networks) and closed conduits (pipelines).

In our U.S. Pat. No. 7,152,001, the entirety of which is herein incorporated, there is disclosed a computer based system for predicting the fluid level in a fluid flow network. The system has been very successful as it can use past and present measurements of parameters to predict and control fluid level and flow. The system gathers data from timed fluid levels and opening positions of regulators or valves to provide a model from which fluid levels and flow can be determined in real time.

Water providers, for example, irrigation authorities, are being required to provide accurate delivery of water to their customers at a time determined by the customer.

OBJECTS OF THE INVENTION

It is an object of the present invention to provide a demand management system for fluid networks to provide a measured fluid flow under a time regime.

SUMMARY OF THE INVENTION

The present invention in one aspect provides a method of demand management for fluid networks, said method including the steps of providing a computer controlled fluid network for delivery of fluid to at least one customer, maintaining a real time database within said computer controlled fluid network of predetermined parameters, requesting a flow rate and time of delivery of said fluid from the fluid network through a user interface to said at least one customer, determining, using predetermined parameters from said real time database, the availability of providing said delivery of said fluid from the fluid network to said at least one customer based on hydraulic capacity of said fluid network, and, if said hydraulic capacity is available, calculating parameters using said real time database to deliver said fluid to said at least one customer through said computer controlled fluid network.

Preferably said method includes the steps of allowing a plurality of customers to access the user interface and said computer controlled fluid network determining a priority and weighting of each request to ensure continuance of said hydraulic capacity.

The invention may also provide the steps of simulating the hydrostatic pressure within said computer controlled fluid network to determine said hydraulic capacity.

In yet a further embodiment said computer controlled fluid network may include a selection from one or more of fluid regulators, valves and sensors coupled to an interface for providing system measurements to said real time database.

Preferably data from a SCADA interface is used to calibrate and continually fine tune the computer controlled fluid network using a model of the pipe network based on system identification techniques.

BRIEF DESCRIPTION OF THE DRAWINGS

The structure and functional features of a preferred embodiment of the present invention will become more apparent from the following detailed description when taken in conjunction with the accompanying drawing, in which:

FIG. 1 is a flow chart of a demand management system of an embodiment of the present invention.

DESCRIPTION OF THE PREFERRED EMBODIMENT

FIG. 1 shows a flow chart for a demand management system for a closed conduit i.e. pipelines. Although the preferred embodiment refers to a closed conduit system the invention is not limited to that environment as it is readily adaptable for use with open conduits i.e. channel networks, especially for irrigation. The system can be readily incorporated into the fluid regulator system disclosed in U.S. Pat. No. 7,152,001 which has herein been incorporated. For a closed conduit system the fluid regulators would be replaced by valves and the fluid level measurements would be substituted by pressure measurements.

A demand management system 10 has a SCADA (Supervisory Control and Data Acquisition) or network software interface 12 which controls the demand management system 10. The term SCADA usually refers to centralized systems which monitor and control systems spread out over large areas.

Known models for pipe networks would be used in the management of demand for these networks. Data from the SCADA interface 12 would be used to calibrate and continually fine tune the model of the pipe network based on system identification techniques. Flow measurement and pressure head measurements (not shown) are located at points (not shown) on the pipe network and are interrogated by the SCADA interface 12. The SCADA interface 12 will interpret the data supplied to calibrate a model of operation to the desired accuracy. The supply points to users 14 are the primary form of control used with a pipe network. The SCADA interface 12 interacts with a main database 16 which has the models and control software associated therewith. The real time measurements from the system are all transferred to main database 16. An operator 18 can interact with the interface 12 to allow the operator to review remote monitoring, control the system 10, check and react to alarm criteria, review real time and historic data and other predetermined requirements.

Customers 20 communicate with an interface 22 which allows a customer to order a selected flow rate at a selected time. Interface 22 can be computer, keyboard or Internet based to allow the customer's desired selections to be entered into the system 10. The desired selections can be considered to be an order for an allocation of water. The system software at step 24 ascertains whether the selected flow rate and selected time can be met by the hydraulic capacity of the network.

If the system can meet the selected flow rate and selected time the order is accepted at step 26. The order will be added to the main database 16 as indicated by path 28. Main database 16 will schedule the selected flow rate and selected time at step 30 to provide appropriate control signals to required valves (not shown) to deliver the selected flow rate at the selected time at step 32.

If the system cannot meet the selected flow rate at the selected time, then at step 34 an array of alternatives, for example, different times and/or different flow rates will be provided to customer 20. The management of demand ensures the hydraulic performance of the fluid network does not deteriorate when the required flow rate exceeds the hydraulic capacity of the fluid network. Business rules, specific to the water supply authority, can be used to determine the priority given to orders and the re-scheduling of any orders that cannot be satisfied. Customer 20 can then accept the rescheduling of the selected time and/or flow rate at step 36 or cancel the order.

Step 24 has a further input from step 38 which calculates the available pressure capacity of the system and provides the desired flow rate to step 24. Step 38 will have further inputs on the maximum pressure that the pipeline can tolerate at 40 and the minimum pressure available for satisfactory service at 42. The software includes a step 44 providing a model which simulates hydrostatic pressure along the pipeline based on demand parameters from main database 16. The model at step 44 provides information in real time and will be influenced by the output 46 from the flow rate delivered to the required valves (not shown) to deliver the selected flow rate at the selected time from step 32.

Main database 16 provides an input 48 to the model at step 44 containing current and future demand information. The fluid network model at steps 38, 44 ensures any future flow demand on the fluid network is within the hydraulic capacity of the fluid network to deliver the required flow regime. This procedure requires that any planned future change in flow demand be processed using the model 38, 44 of the fluid network before being accepted as future change in demand on the fluid network. Future changes in flow demand are therefore processed by the model 38, 44 to determine if the controller of the fluid network is capable of delivering the required flow. Under this regime changes in flow demand are processed as order transactions as previously described. The model establishes if an order request does not result in the maximum and minimum flow boundaries 40, 42 to be exceeded at any point on the network.

The system requires orders to be first processed some period in advance of the desired flow change. The preferred embodiment uses a computer application or program to process individual orders on-line with the model 38, 44 determining if the demand can be met given the aggregate knowledge of all orders on the fluid network. Orders may also be processed in batch mode where a group of orders are pre-processed where each order may be given a pre-determined priority or weighting. If a pump is used as part of the fluid network, the pump can also provide regulated control of the fluid network to achieve the required flows, levels and pressures.

Although the preferred embodiment uses a closed conduit (pipeline network) the management of demand is equally applicable to channel networks (open conduits). Pipes typically operate within a wider range of head pressure and therefore do not require as much network control as a channel network. The controller for a pipe network is much simpler for a pipe network with the principle form of control being maintaining the flow at the supply point equal to that of the order. The management of demand is especially applicable to gravity pipe networks commonly used for the supply of irrigation water.

Gravity pipe networks typically operate within limited pressure head and therefore are constrained in their capability to continually meet demand.

Pumps may also be used in open conduits.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. A method of managing a demand for water from a computer-controlled water network, the network being for delivering water to one or more customers, the method including the steps of:
    maintaining within the network a real-time database of predetermined first parameters;
    receiving a request from a particular customer of the one or more customers through a user interface, the request being for a desired flow rate and time of delivery of water from the network to the particular customer of the one or more customers;
    determining, using the predetermined first parameters from the real-time database, an availability of the desired flow rate and time of delivery based on hydraulic capacity of the network; and
    if the hydraulic capacity is available, using the real-time database to calculate second parameters to deliver water to the particular customer of the one or more customers through the network at the desired flow rate and time of delivery.

2. The method of claim 1, further including the steps of:
    allowing a plurality of the one or more customers to generate a plurality of requests through the user interface; and
    determining a priority and weighting of each request to ensure continuance of the hydraulic capacity.

3. The method of claim 1, further including the step of simulating hydrostatic pressure within the network to determine the hydraulic capacity.

4. The method of claim 1, wherein the network includes a selection from one or more of liquid regulators, valves, and sensors coupled to an interface for providing system measurements to the real-time database.

5. The method of claim 1, wherein data from a supervisory control and data acquisition (SCADA) interface is used to calibrate and continually fine tune the network using a model of a pipe network based on system identification techniques.

6. The method of claim 5, further including an operator interface interacting with the SCADA interface to oversee operation of the network.

7. The method of claim 1, further including the step of rescheduling the flow rate and time of delivery of the water from the network if the hydraulic capacity is not available.

8. A demand-management system for managing a demand for water from a computer-controlled water network, the network being for delivering water to one or more customers, the demand including at least one request for a desired flow rate and time of delivery of water from the network to a particular customer of the one or more customers;

the system including:
- a real-time database of predetermined first parameters; and
- at least one computation device configured to receive the at least one request;
- determine, using the predetermined first parameters from the real-time database, an availability of the desired flow rate and time of delivery based on hydraulic capacity of the network; and
- if the hydraulic capacity is available, using the real-time database to calculate second parameters to deliver water to the particular customer of the one or more customers through the network at the desired flow rate and time of delivery.

9. The method of claim 1, further including:
providing a control signal to at least one of an open conduit system or a closed conduit system in the water network based on the calculated second parameters.

10. The demand-management system of claim 8, the system further including:
a control signal output providing a control signal to at least one of an open conduit system or a closed conduit system in the water network based on the calculated second parameters.

* * * * *